United States Patent
Jung et al.

(10) Patent No.: US 11,086,528 B2
(45) Date of Patent: Aug. 10, 2021

(54) MEMORY CONTROLLER AND MEMORY SYSTEM HAVING THE SAME

(71) Applicant: SK hynix Inc., Gyeonggi-do (KR)

(72) Inventors: Seok Hoon Jung, Gyeonggi-do (KR); Min Seong Chae, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/533,050

(22) Filed: Aug. 6, 2019

(65) Prior Publication Data
US 2020/0192581 A1 Jun. 18, 2020

(30) Foreign Application Priority Data
Dec. 14, 2018 (KR) .................. 10-2018-0161926

(51) Int. Cl.
*G06F 3/06* (2006.01)

(52) U.S. Cl.
CPC .......... *G06F 3/0613* (2013.01); *G06F 3/0655* (2013.01); *G06F 3/0673* (2013.01)

(58) Field of Classification Search
CPC . G06F 3/06; G06F 3/00; G06F 3/0613; G06F 3/0655; G06F 3/0673
USPC ....................................... 711/154
See application file for complete search history.

(56) References Cited

U.S. PATENT DOCUMENTS

| | | | |
|---|---|---|---|
| 10,013,194 B1* | 7/2018 | Yang .............. | G06F 3/0619 |
| 10,387,078 B1* | 8/2019 | Benisty .......... | G06F 3/0679 |
| 2015/0309752 A1* | 10/2015 | Ellis ............. | G06F 3/0625 |
| | | | 711/103 |
| 2016/0313944 A1* | 10/2016 | Hodgdon ........ | G06F 3/0647 |
| 2017/0212711 A1 | 7/2017 | Inoue | |
| 2018/0046231 A1* | 2/2018 | Raghu ........... | G06F 3/0653 |
| 2018/0173464 A1* | 6/2018 | Wongso ......... | G06F 11/3034 |
| 2019/0012101 A1* | 1/2019 | Jenne ............ | G06F 1/3275 |
| 2019/0012263 A1* | 1/2019 | Jenne ............ | G06F 3/0653 |
| 2019/0094938 A1* | 3/2019 | Tidwell .......... | G06F 1/329 |

(Continued)

FOREIGN PATENT DOCUMENTS

| | | |
|---|---|---|
| KR | 10-2016-0094764 | 8/2016 |
| KR | 10-2016-0122483 | 10/2016 |

(Continued)

OTHER PUBLICATIONS

Eshghi, K et al., SSD Architecture and PCI Express Interface, Inside Solid State Drives (SSDs), 2013, pp. 19-45, Springer Science+Business Media Dordrecht.

(Continued)

*Primary Examiner* — Christopher B Shin
(74) *Attorney, Agent, or Firm* — IP & T Group LLP

(57) ABSTRACT

There are provided a memory controller and a memory system having the same. The memory controller includes: a command generator configured to generate a command in response to a request received from a host; a throttling manager configured to activate or inactivate a delay signal by comparing a current throughput of data that is being currently processed in a memory system and a request throughput of data that is to be processed in the memory system; and a completion signal output circuit configured to delay an output of a completion signal with respect to the request when the delay signal is activated, and outputs the completion signal when the delay signal is inactivated.

17 Claims, 11 Drawing Sheets

(56) References Cited

U.S. PATENT DOCUMENTS

2019/0250848 A1* 8/2019 Benisty .................. G06F 3/0659
2019/0317672 A1* 10/2019 Linnen .................. G06F 3/0647
2020/0272577 A1* 8/2020 Zeng ................... G06F 12/0804

FOREIGN PATENT DOCUMENTS

KR    10-2017-0012443    2/2017
KR    10-2017-0085286    7/2017

OTHER PUBLICATIONS

PCI Express Base Specification Revision 3.0, Nov. 10, 2010, pp. 2-860.
NVM Express™ Base Specification, NVM Express Revision 1.3c, May 24, 2018, pp. 1-292.
Agrawal, N et al., Design Tradeoffs for SSD Performance, 2008, pp. 57-70, USENIX '08: 2008 USENIX Annual Technical Conference.
Kang, J.U et al., A Superblock-based Flash Translation Layer for NAND Flash Memory, Oct. 22-25, 2006, pp. 161-170, EMSOFT' 2006, Seoul, Korea.
Chang, L.P et al., Real-Time Garbage Collection for Flash-Memory Storage Systems of Real-Time Embedded Systems, ACM Transactions on Embedded Computing Systems, Jun. 2004, pp. 1-26, vol. V. No. N, National Taiwan University.

* cited by examiner

| RS | CS |
|---|---|
| requested data size (81) | current data size (82) |
| requested number of CMD (83) | current number of CMD (84) |
| requested depth of CMD (85) | current depth of CMD (86) |
| mixture of (81), (83), (85) | mixture of (82), (84), (86) |

FIG. 14

| SB  | RS(MB) | CS(MB) | index | PF  | APF   | THR  |
|-----|--------|--------|-------|-----|-------|------|
| SB1 | 85     | 16     | 0.19  | 300 | 92.96 | -207 |
| SB2 | 85     | 195    | 2.30  | 131 | 92.96 | -38  |
| SB3 | 85     | 254    | 2.99  | 100 | 92.96 | -7   |
| SB4 | 85     | 496    | 5.51  | 54  | 92.96 | +39  |
| SB5 | 85     | 938    | 11.03 | 27  | 92.96 | +66  |
| SB6 | 85     | 1328   | 15.63 | 19  | 92.96 | +74  |
| SB7 | 85     | 1349   | 15.88 | 19  | 92.96 | +74  |

| SB  | RS(MB) | CS(MB) | index | PF  | APF | THR |
|-----|--------|--------|-------|-----|-----|-----|
| SB1 | 85     | 0      | 0     | 300 | 300 | 0   |
| SB2 | 85     | 0      | 0     | 300 | 300 | 0   |
| SB3 | 85     | 0      | 0     | 300 | 300 | 0   |
| SB4 | 85     | 0      | 0     | 300 | 300 | 0   |
| SB5 | 85     | 0      | 0     | 300 | 300 | 0   |
| SB6 | 85     | 0      | 0     | 300 | 300 | 0   |
| SB7 | 85     | 0      | 0     | 300 | 300 | 0   |

FIG. 16

| SB  | RS(MB) | CS(MB) | index | PF | APF | THR |
|-----|--------|--------|-------|----|-----|-----|
| SB1 | 85     | 1328   | 15.63 | 19 | 19  | 0   |
| SB2 | 85     | 1328   | 15.63 | 19 | 19  | 0   |
| SB3 | 85     | 1328   | 15.63 | 19 | 19  | 0   |
| SB4 | 85     | 1328   | 15.63 | 19 | 19  | 0   |
| SB5 | 85     | 1328   | 15.63 | 19 | 19  | 0   |
| SB6 | 85     | 1328   | 15.63 | 19 | 19  | 0   |
| SB7 | 85     | 1328   | 15.63 | 19 | 19  | 0   |

MEMORY CONTROLLER AND MEMORY SYSTEM HAVING THE SAME

CROSS-REFERENCE TO RELATED APPLICATION

The present application claims priority under 35 U.S.C. § 119(a) to Korean patent application number 10-2018-0161926, filed on Dec. 14, 2018, which is incorporated herein by reference in its entirety.

BACKGROUND

Field of Invention

Various embodiments of the present disclosure generally relate to a memory controller and a memory system having the same. Particularly, the embodiments relate to a memory controller including a throttling manager and a memory system having the same.

Description of Related Art

A memory system may include a memory device and a memory controller.

The memory device may store data or output stored data. For example, the memory device may be configured as a volatile memory device in which stored data is lost when the supply of power is interrupted, or be configured as a nonvolatile memory device in which stored data is retained even when the supply of power is interrupted.

The memory controller may control data communication between a host and the memory device. When the memory device is configured as a nonvolatile flash memory device, the memory controller may include a Flash Translation Layer (FTL) to communicate between the memory device and the host.

The host may communicate with the memory device through the memory controller by using an interface protocol, such as Peripheral Component Interconnect-Express (PCI-e or PCIe), Advanced Technology Attachment (ATA), Serial ATA (SATA), Parallel ATA (DATA), or Serial Attached SCSI (SAS). Other interface protocols that may be used for communication between the host and the memory system include any of various interfaces such as a Universal Serial Bus (USB), a Multi-Media Card (MMC), an Enhanced Small Disk Interface (ESDI), and Integrated Drive Electronics (IDE).

SUMMARY

Embodiments provide a memory controller and a memory system having the same, in which a time at which a completion signal is output is adjusted by considering an internal throughput of the memory system, so that throttling of the memory system can be efficiently performed.

According to an aspect of the present disclosure, there is provided a memory controller including: a command generator configured to generate a command in response to a request received from a host; a throttling manager configured to activate or inactivate a delay signal by comparing a current throughput of data that is being currently processed in a memory system and a request throughput of data that is to be processed in the memory system; and a completion signal output circuit configured to delay an output of a completion signal with respect to the request when the delay signal is activated, and outputs the completion signal when the delay signal is inactivated.

According to another aspect of the present disclosure, there is provided a memory system including: a plurality of dies configured to store data; a memory controller configured to communicate between a host and the dies; and a buffer memory configured to temporarily store commands generated in the memory controller, wherein the memory controller groups a plurality of memory blocks included in the dies into a plurality of super blocks, adjusts a throttling rate according to a current throughput of each of the super blocks and a request throughput of each of the super blocks, which is to be processed, and adjusts a performance value of each of the super blocks according to the throttling rate.

According to another aspect of the present disclosure, there is provided a memory system including: a memory controller that controls communication between a host and the memory device; and wherein the memory controller: receives, from a host, a first request for the memory device; determines a total throughput of the memory system based on a current throughput of the memory system and a request throughput associated with the first request; compares the total throughput with a target size; and transmits, to the host, a signal based on a result of the comparison, such that the host transmits a second request in response to the signal.

BRIEF DESCRIPTION OF THE DRAWINGS

Various embodiments are described more fully below with reference to the accompanying drawings; however, the present invention may be embodied in different forms and should not be construed as limited to the embodiments set forth herein. Rather, these embodiments are provided so that this disclosure is thorough and complete and fully conveys the scope of the embodiments to those skilled in the art. Throughout the specification, reference to "an embodiment," "another embodiment" or the like is not necessarily to only one embodiment, and different references to any such phrase are not necessarily to the same embodiment(s).

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIGS. 12 to 16 are diagram illustrating still another embodiment of the present disclosure.

DETAILED DESCRIPTION

In the present disclosure, advantages, features and methods for achieving various embodiments of the present disclosure will become more apparent after a reading of the following embodiments taken in conjunction with the drawings. The present disclosure may, however, be embodied in different forms and should not be construed as being limited to the embodiments set forth herein. Rather, these embodiments are provided to describe the present disclosure in detail to the extent that those skilled in the art to which the disclosure pertains may easily practice the present invention.

It is noted that reference to "an embodiment," "another embodiment" or the like does not necessarily mean only one embodiment, and different references to any such phrase are not necessarily to the same embodiment(s).

In the entire specification, when an element is referred to as being "connected" or "coupled" to another element, it can be directly connected or coupled to another element or be indirectly connected or coupled to another element with one or more intervening elements interposed therebetween. In addition, when an element is referred to as "including" a component, this indicates that the element may further include one or more other components, instead of excluding such other component(s), unless the context indicates otherwise.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

Figure 1:
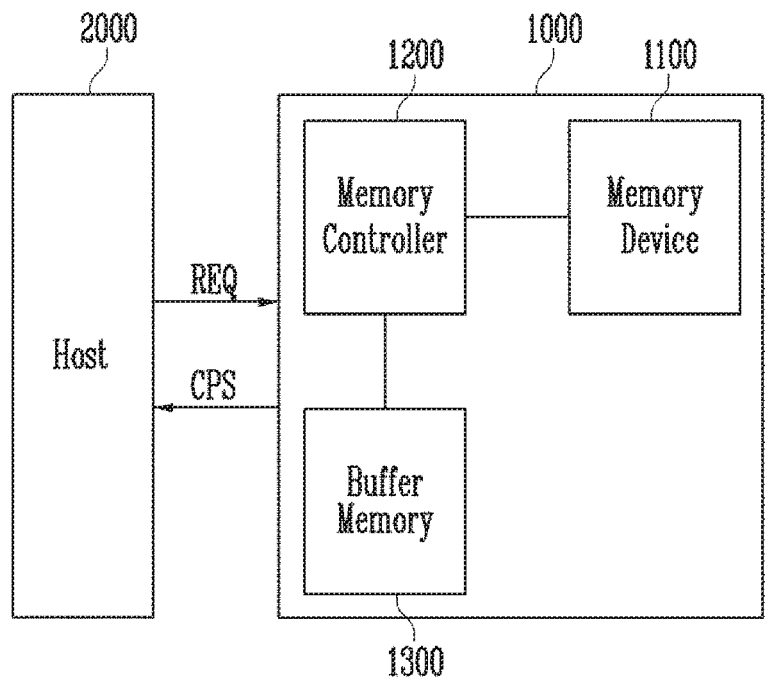
FIG. 1 is a diagram illustrating a memory system according to an embodiment of the present disclosure.

FIG. 1 is a diagram illustrating a memory system according to an embodiment of the present disclosure.

Referring to FIG. 1, the memory system 1000 may include a memory device 1100 for storing data, a buffer memory 1300 and a memory controller 1200. The buffer memory 1300 may temporarily store a command and data, which are necessary for an operation of the memory system 1000. The memory controller 1200 may control the memory device 1100 and the buffer memory 1300 under the control of a host 2000.

The host 2000 may communicate with the memory system 1000, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The memory device 1100 may be implemented with a volatile memory device in which stored data disappears when the supply of power is interrupted, or be implemented with a nonvolatile memory device in which data is retained even when the supply of power is interrupted. In this embodiment, a flash memory device that is a kind of nonvolatile memory device will be described as an example.

The memory controller 1200 may control overall operations of the memory system 1000, and control data exchange between the host 2000 and the memory device 1100. The memory controller 1200 may be coupled to the memory device 1100 through a channel, and transmit a command, an address, and data through the channel. For example, the memory controller 1200 may transmit a command for programming, reading or erasing data to the memory device 1100 through the channel in response to a request from the host 2000.

More specifically, the memory controller 1200 may control command and data exchange between the host 2000 and the buffer memory 1300, or temporarily store system data for controlling the memory device 1100 in the buffer memory 1300. For example, when the memory controller 1200 receives a request REQ for a program, read or erase operation from the host 2000, the memory controller 1200 may generate a command and temporarily store the generated command in the buffer memory 1300.

The buffer memory 1300 may be disposed externally to the memory controller 1200 as shown in FIG. 1, or may be disposed in the memory controller 1200, depending on the memory system 1000. The buffer memory 1300 may be used as a working memory, cache memory or buffer memory of the memory controller 1200, and temporarily store mapping information relating to physical information and logical information. Also, the buffer memory 1300 may temporarily store commands before commands generated by the memory controller 1200 are fetched. For example, the buffer memory 1300 may temporarily store a host command queue. In some embodiments, the buffer memory 1300 may include a Double Data Rate Synchronous Dynamic Random Access Memory (DDR SDRAM), a Low Power Double Data Rate 4 (LPDDR4) SDRAM, a Graphics Double Data Rate (DDDR) SDRAM, a Low Power DDR (LPDDR), a Rambus Dynamic Random Access Memory (RDRAM), or the like.

In general, when commands temporarily stored in the buffer memory 1300 are fetched to the memory device 1100, an empty region is generated in the buffer memory 1300. When the empty region is generated in a region in which commands are temporarily stored in the buffer memory 1300, the memory system 1000 may output a completion signal CPS for receiving a next request REQ to the host 2000. When the host 2000 receives the completion signal CPS from the memory system 1000, the host 2000 may output a request REQ for a next operation to the memory system 1000. The completion signal CPS may be expressed as a completion queue, or a completion command, depending on the memory system 1000.

However, although the memory system 1000 outputs a completion signal CPS by fetching a command, the memory system 1000 may internally perform an operation for processing the fetched command. That is, when the memory system 1000 internally performs the operation, the host 2000 may transmit a next request REQ to the memory system 1000 in response to the completion signal CPS. Since the memory system 1000 receives a request REQ for a next operation even when a previous operation is still performed, an overload may be applied to the memory system 1000. Therefore, the temperature of the memory system 1000 may be increased, and a throttling operation for suppressing an increase in temperature may be performed. When the throttling operation is performed, the performance of the memory system 1000 is temporarily decreased, and hence it is desirable to configure an arrangement in which the throttling operation is not frequently preformed.

Accordingly, in this embodiment, the memory controller 1200 is configured to output a completion signal CPS according to an internal throughput of the memory system 1000, regardless of the number of commands queued in the buffer memory 1300 or an empty region of the buffer memory 1300. That is, in this embodiment, the memory controller 1200 may delay a time at which the completion signal CPS is output according to a current throughput processed in the memory system 1000 and a request throughput to be processed in response to a request from the host 2000. The completion signal CPS is delayed according to the internal throughput of the memory system 1000, so that overload of the memory system 1000 may be suppressed. Accordingly, the number of times in which the throttling operation of the memory system 1000 is performed may be decreased. When such number is decreased, that may prevent the performance of the memory system 1000 from decreasing. In other words, the number of times in which the throttling operation is performed is decreased, to ensure that even the lowest performance of the memory system 1000 is sufficient. The memory controller 1200 will be described in detail as follows.

Figure 2:
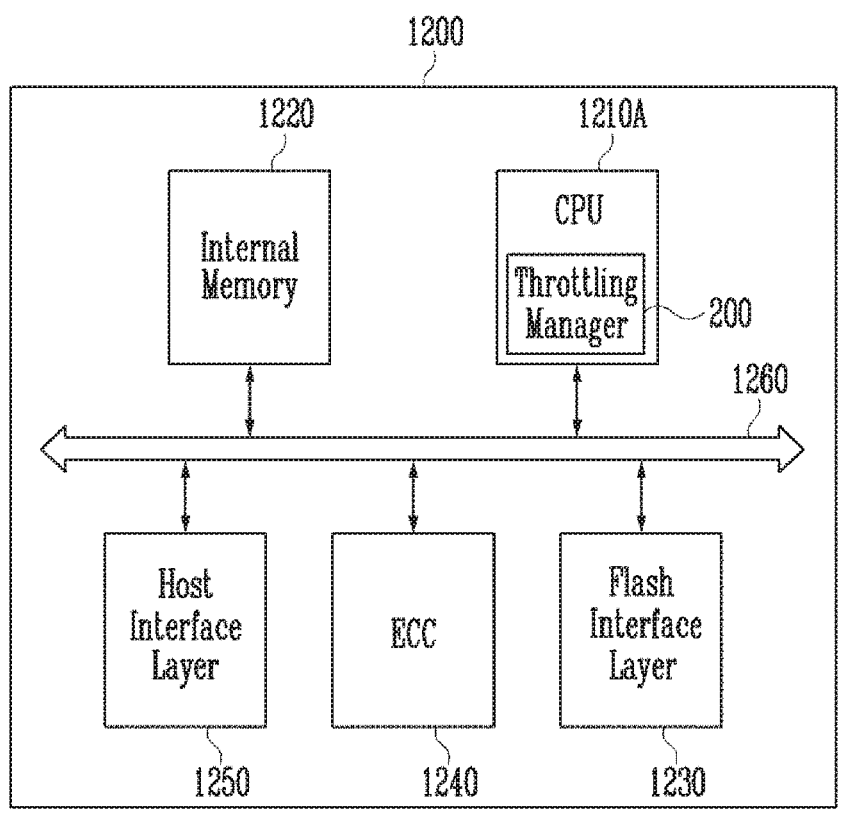
FIG. 2 is a diagram illustrating a memory controller according to an embodiment of the present disclosure.

FIG. 2 is a diagram illustrating a memory controller according to an embodiment of the present disclosure.

Referring to FIG. 2, the memory controller 1200 may include a central processing unit (CPU) 1210A, an internal memory 1220, a flash interface layer 1230, an error correction circuit (ECC) 1240, and a host interface layer 1250 so as to communicate between the host 2000 and the memory device 1100. The CPU 1210A, the internal memory 1220, the flash interface layer 1230, the ECC 1240, and the host interface layer 1250 may communicate with each other through a bus 1260.

When the CPU 1210A receives a request REQ from the host 2000 of FIG. 1, the CPU 1210A may generate a command for performing the received request REQ. The CPU 1210A may store the generated command in the buffer memory 1300 of FIG. 1, and sequentially fetch commands temporarily stored in the buffer memory 1300. The CPU 1210A may include a throttling manager 200 for controlling a throttling operation of the memory system 1000. That is, the throttling manager 200 may be disposed within the CPU 1210A. The throttling manager 200 may control the throttling operation by controlling delay of a completion signal according to a current throughput that is being processed in the memory system 1000 and a request throughput that is to be processed in the future by a request from the host 2000.

The internal memory 1220 may store various system information necessary for an operation of the memory controller 1200. For example, the internal memory 1220 may be implemented with a static random access memory (SRAM). The internal memory 1220 may store address mapping information and logical information, which are necessary for an operation of the memory system 1000.

The flash interface layer 1230 may communicate with the memory device 1100 under the control of the CPU 1210A. For example, the flash interface layer 1230 may queue commands received from the CPU 1210A in a queue therein according to a status of the memory device 1100, and output the commands to the memory device 1100 according to the queued order.

The ECC 1240 may perform an error correction operation under the control of the CPU 1210A. For example, the ECC 1240 may perform the error correction operation according to an error correction command and physical and logical information, which are received from the CPU 1210A.

The host interface layer 1250 may communicate with the host 2000 coupled to the memory system 1000 under the control of the CPU 1210A. For example, the host interface layer 1250 may receive various requests such as a program request, a read request, and an erase request from the host 2000, and output data read from the memory device 1100 to the host 2000.

Figure 3:
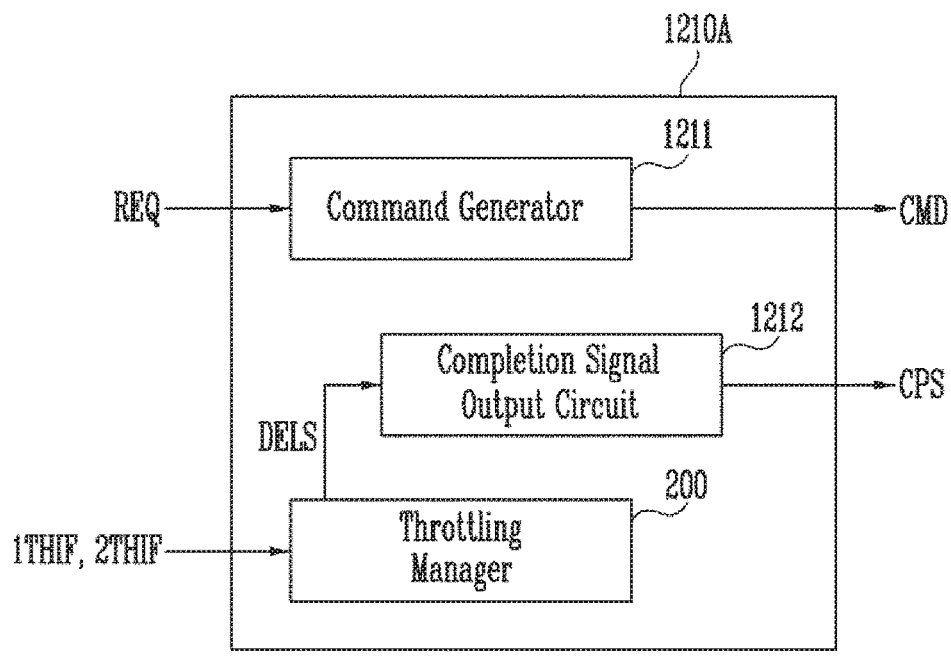
FIG. 3 is a diagram illustrating an example of a central processing unit (CPU) shown in FIG. 2.

FIG. 3 is a diagram illustrating a central processing unit (CPU), e.g., the CPU 1210A shown in FIG. 2, according to an embodiment of the present disclosure.

Referring to FIG. 3, the CPU 1210A may include a command generator 1211, a completion signal output circuit 1212, and the throttling manager 200.

When a request REQ for a program, read or erase operation is received from the host 2000, the command generator 1211 may convert the received request REQ into a command CMD to be used in the memory system 1000, and output the converted command CMD.

The completion signal output circuit 1212 may delay or output a completion signal CPS in response to a delay signal DELS output from the throttling manager 200.

The throttling manager 200 may output the delay signal DELS according to an internal throughput of the memory system 1000. For example, the throttling manager 200 may output the delay signal DELS according to first throughput information 1THIF and second throughput information 2THIF. The first throughput information 1THIF may include information on an amount of data that is being currently processed in the memory system 1000. The second throughput information 2THIF may include information on an amount of data that is to be processed in the future by a request from the host 2000. The throttling manager 200 may output the delay signal DELS by comparing the first throughput information 1THIF with the second throughput information 2THIF with each other. The delay signal DELS may be output to the completion signal output circuit 1212. For example, the throttling manager 200 may determine a time at which the delay signal DELS is output and a time for which the delay signal DELS is maintained according to a calculated internal throughput. While the delay signal DELS is being output from the throttling manager 200, the completion signal output circuit 1212 does not output the completion signal CPS but may delay the completion signal CPS.

Figure 4:
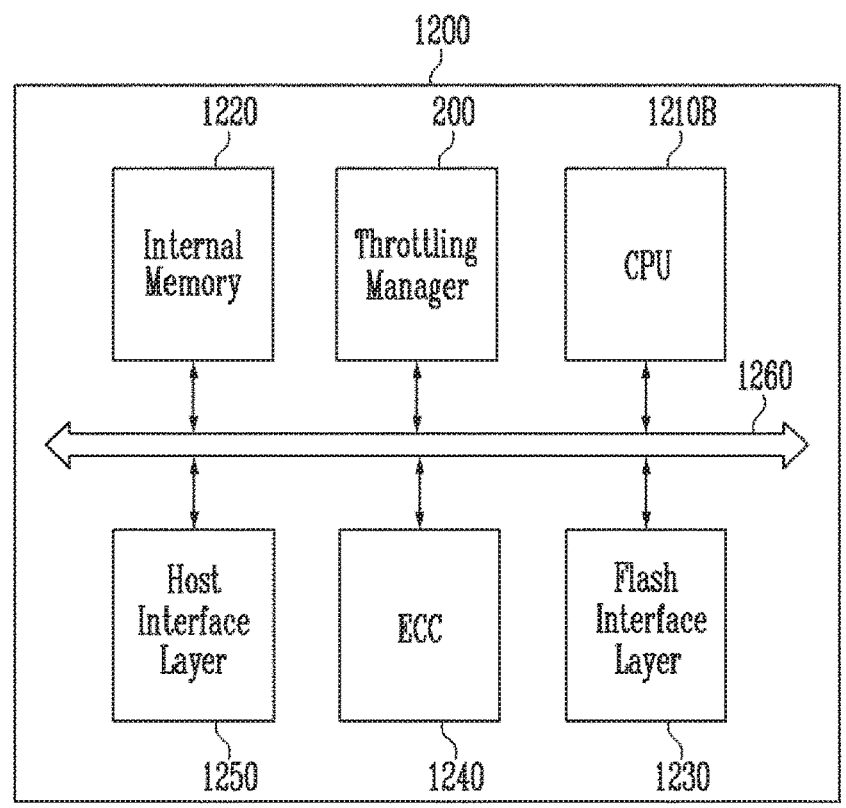
FIG. 4 is a diagram illustrating a memory controller according to another embodiment of the present disclosure.

FIG. 4 is a diagram illustrating a memory controller 1200 according to another embodiment of the present disclosure.

Referring to FIG. 4, the memory controller 1200 may include a central processing unit (CPU) 1210B, an internal memory 1220, a flash interface layer 1230, an error correction circuit (ECC) 1240, a host interface layer 1250 and a throttling manager 200. The throttling manager 200 may be disposed externally to the central processing unit (CPU) 1210B. The throttling manager 200 may control a throttling operation by controlling delay of a completion signal according to a current throughput that is being processed in the memory system 1000 and a request throughput that is to be processed in the future by a request from the host 2000. The internal memory 1220, the flash interface layer 1230, the ECC 1240, and the host interface layer 1250, which are shown in FIG. 4, are identical to those shown in FIG. 2, and therefore, description thereof is omitted here.

Figure 5:
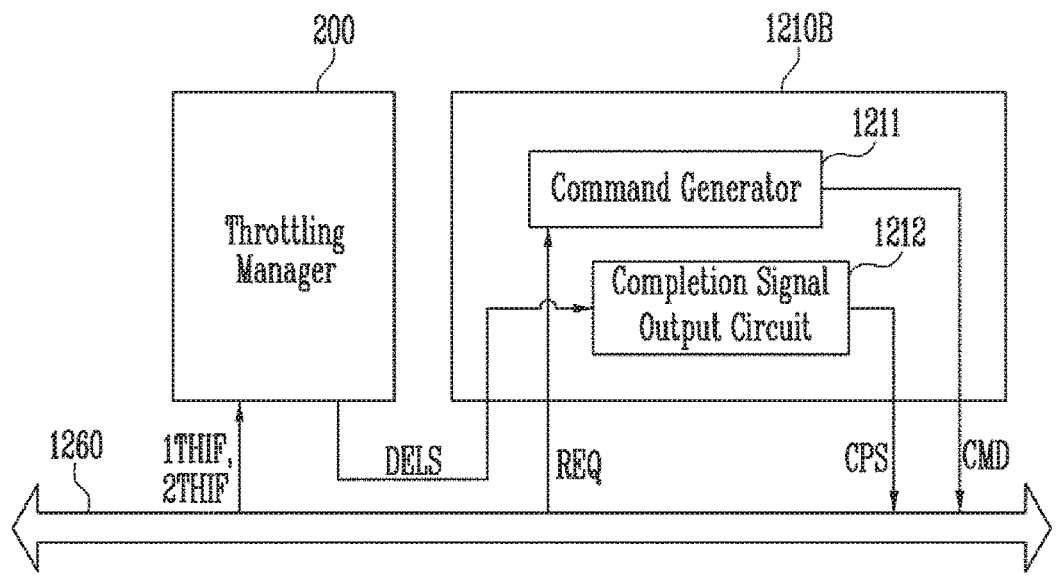
FIG. 5 is a diagram illustrating an example of a central processing unit (CPU) shown in FIG. 4.

FIG. 5 is a diagram illustrating a central processing unit (CPU), e.g., the CPU 1210B shown in FIG. 4, according to an embodiment of the present disclosure.

Referring to FIG. 5, unlike the configuration shown in FIG. 2, the throttling manager 200 is disposed externally to the CPU 1210B. A delay signal DELS output from the throttling manger 200 may be transmitted to a completion signal output circuit 1212 through a bus 1260. As described above, when the throttling manager 200 is disposed externally to the CPU 1210B, the throughput of the CPU 12108 is decreased, and thus the performance of the CPU 1210B may be prevented from being decreased.

Figure 6:
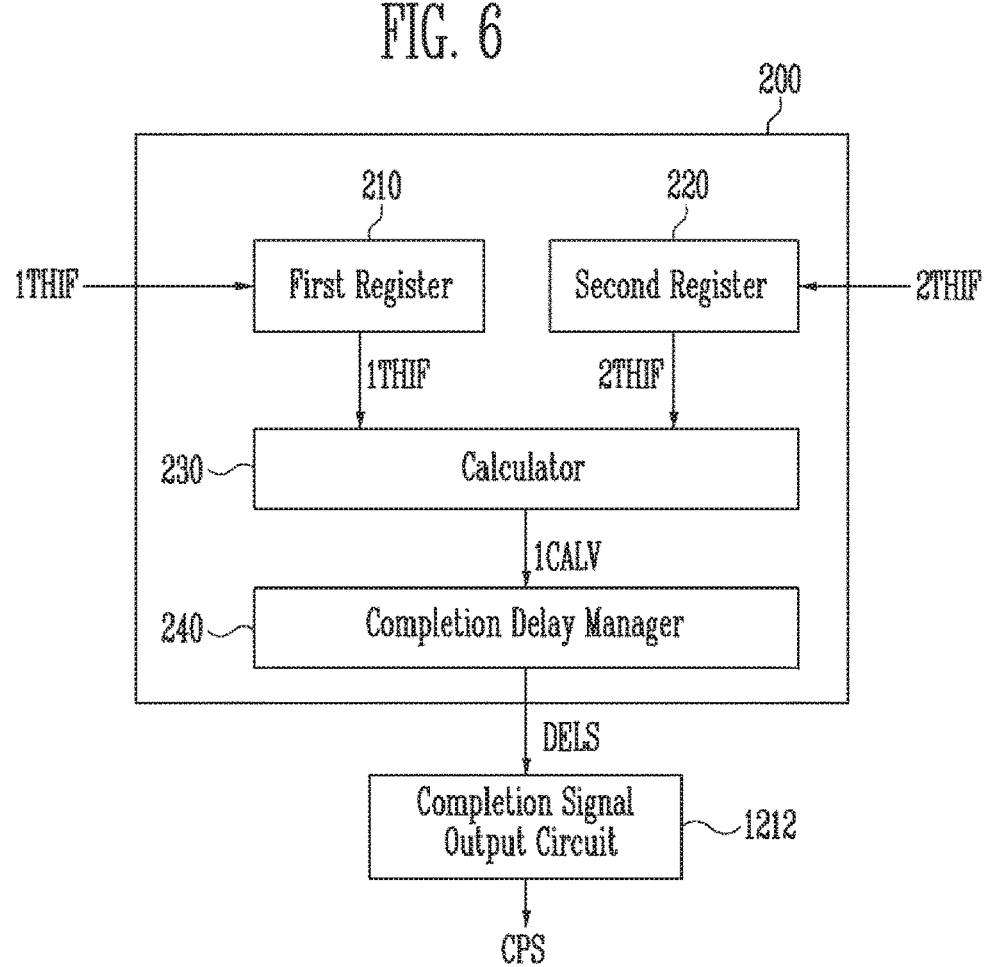
FIG. 6 is a diagram illustrating a throttling manager according to an embodiment of the present disclosure.

FIG. 6 is a diagram illustrating a throttling manager according to an embodiment of the present disclosure, which may be applied both the throttling managers 200 shown in FIGS. 2 and 4.

Referring to FIG. 6, the throttling manager 200 may include a first register 210, a second register 220, a calculator 230, and a completion delay manager 240.

The first register 210 may temporarily store and output first throughput information 1THIF of the memory system 1000. The second register 220 may temporarily store and output second throughput information 2THIF of the memory system 1000.

The first throughput information 1THIF may include information on an amount of data that is being currently processed in the memory system 1000. The second throughput information 2THIF may include information on a data size requested from the host 2000.

For example, the first throughput information 1THIF may be information on a total data size that is being currently processed in the memory system 1000, information on a data size that is being currently processed in a selected super block, or information on a data size that is being currently processed in a selected memory block. The second throughput information 2THIF may be information on a total data size that is to be processed in the memory system 1000 by a request from the host 2000, information on a data size that is to be processed in a selected super block, or information on a data size that is to be processed in a selected memory block. The data size may be provided in units of megabytes (MBs), or gigabytes (GBs), or other suitable unit, depending on the memory system 1000.

The first throughput information 1THIF may be information on a data size that is processed in a background operation of the memory system 1000 or information on a data size that is processed in an operation performed by a request from the host 2000. Alternatively, the first throughput information 1THIF may include the number of commands that are being currently executed in the memory system 1000, or include a depth of a command queue. Alternatively, the first throughput information 1THIF may be a combination of the above-described values. Although a request is not received from the host 2000, the first throughput information 1THIF may be updated in the first register 210 whenever a command is executed in the memory system 1000, or be stored in the first register 210 only when a request is received from the host 2000.

The second throughput information 2THIF may be included in a request received from the host 2000, and be stored in the second register 220 whenever a request is received from the host 2000. When a request is received from the host 2000, the first and second registers 210 and 220 may transmit the stored first and second throughput information 1THIF and 2THIF to the calculator 230.

The calculator 230 may calculate a total throughput by adding the first throughput information 1THIF and the second throughput information 2THIF, and output a first calculation value 1CALV by comparing the total throughput with a target size. The target size may be a reference value at which a throttling operation is performed in the memory system 1000, and be set to different values depending on the memory system 1000. The calculator 230 may output the first calculation value 1CALV in various ways. For example, when the value obtained by adding the first throughput information 1THIF and the second throughput information 2THIF is greater than the target size, the calculator 230 may output the first calculation value 1CALV as a logic high level HIGH. When the value obtained by adding the first throughput information 1THIF and the second throughput information 2THIF is less than the target size, the calculator 230 may output the first calculation value 1CALV to be a logic low level, i.e., LOW. A time for which the first calculation value 1CALV maintains a logic high level, i.e., HIGH may be determined according to the difference between the value obtained by adding the first throughput information 1THIF and the second throughput information 2THIF and the target size. For example, the value obtained by adding the first throughput information 1THIF and the second throughput information 2THIF becomes greater than the target size, the time for which the first calculation value 1CALV maintains HIGH may become longer.

Alternatively, the calculator 230 may output the first calculation value 1CALV as different codes, based on a result obtained by comparing the value obtained by adding the first throughput information 1THIF and the second throughput information 2THIF with the target size. The number of bits of a code constituting the first calculation value 1CALV may be set according to a resolution of the first calculation value 1CALV. The greater the number of bits of the code constituting the first calculation value 1CALV, the higher the resolution of the first calculation value 1CALV, and thus a delay time may be more accurately adjusted with a higher 1CALV resolution.

The completion delay manger 240 may be differently implemented depending on a logic value of the first calculation value 1CALV output from the calculator 230.

The completion delay manager 240 may output a delay signal DELS for delaying a completion signal according to the first calculation value 1CALV. For example, when the first calculation value 1CALV may be output as a signal of logic high level, i.e., HIGH or logic low level, i.e., LOW, the completion delay manger 240 may output the delay signal DELS only when the first calculation value 1CALV is HIGH. More specifically, the completion delay manger 240 may activate the delay signal DELS as HIGH while the first calculation value 1CALV is being applied as HIGH. When the first calculation value 1CALV is changed to LOW, the completion delay manager 240 may inactivate the delay signal DELS as LOW. Alternatively, when the first calculation value 1CALV is output as a code configured with a plurality of bits, the completion delay manager 240 may output the delay signal DELS as HIGH or LOW according to the code constituting the first calculation value 1CALV, and adjust a time for which the delay signal DELS maintains HIGH.

When the delay signal DELS is inactivated, the completion signal output circuit 1212 may not output a completion signal CPS. When the delay signal DELS is activated, the completion signal output circuit 1212 may output the completion signal CPS. The completion signal CPS output from the completion signal output circuit 1212 may be transmitted to the host 2000. When the completion signal CPS is received, the host 2000 may determine that a host command queue of the memory system 1000 is empty, and transmit a next request to the memory system 1000.

Figures 7, 8:
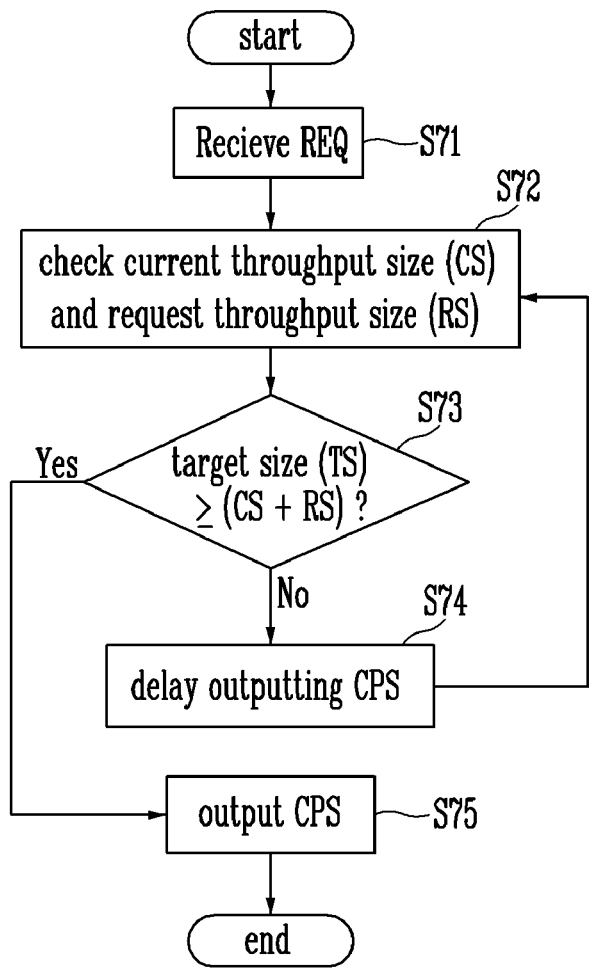
FIG. 7 is a flowchart illustrating an operation of a memory system according to an embodiment of the present disclosure.
FIG. 8 is a table illustrating exemplary elements that have influence on a request throughput and a current throughput.

FIG. 7 is a flowchart illustrating an operation of a memory system according to an embodiment of the present disclosure. The operation of FIG. 7 may be performed by the memory system 1000 and the host 2000 as shown in FIGS. 1 to 6. FIG. 8 is a table illustrating elements that have influence on a request throughput and a current throughput.

Referring to FIG. 7, when a request REQ is received from the host (e.g., the host 2000) (S71), the memory controller 1200 of FIGS. 2 and 4 may check a current throughput CS and a request throughput RS (S72). The current throughput CS and the request throughput RS may be calculated as various values.

Referring to FIG. 8, the request throughput RS may include any one of a requested data size 81 requested by the host 2000, a requested number of commands (CMD) 83 requested by the host 2000, and a requested depth of CMD 85 requested by the host 2000. Alternatively, the request throughput RS may be a value obtained by adding some or all of the request data size 81, the requested number of CMD 83, and the requested depth of CMD 85. The current throughput CS may include any one of a current data size 82 that is being processed in the memory system 1000, a current number of CMD 84 that are being executed in the memory system 1000, and a current depth of CMD 86 that are queued in the memory system 1000. Alternatively, the current throughput CS may be a value obtained by adding some or all of the current data size 82, the current number of CMD 84, and the current depth of CMD 86. The types of information included in the current throughput CS and the request throughput RS may be preset in the memory system 1000. All or some of the types of information identified in FIG. 8 may be included. For example, types of information included in the current throughput CS and the request throughput RS may be selected according to settings of the CPU 1210A or 1210B, and information of the selected current throughput CS and the selected request throughput RS may be input to the first register 210 and the second register 220 of FIG. 6, respectively.

When the information on the current throughput CS and the request throughput RS are input to the first and second registers 210 and 220, the calculator 230 of FIG. 6 may calculate a total throughput (CS+RS) by adding the current throughput CS and the request throughput RS, and compare the total throughput (CS+RS) with a target size TS (S73).

When the total throughput (CS+RS) is less than or equal to the target size TS (Yes at step S73), a completion signal CPS is output (S75). When the total throughput (CS+RS) is greater than the target size TS (No at step S73), the completion signal CPS is not output but delayed (S74). For example, when the total throughput (CS+RS) is greater than the target size TS (S73, No), the completion delay manager 240 of FIG. 6 may output a delay signal DELS. While the delay signal DELS is being activated, the completion signal CPS is not output but may be delayed.

When the completion signal CPS is delayed, the process returns to step S72 where throughput is re-calculated. That is, since the internal throughput of the memory system 1000 decreases with the passage of time, the total throughput (CS+RS) may be changed when the throughput is re-calculated at step S72. Therefore, when the total throughput (CS+RS) is less than or equal to the target size TS at the step S73 (Yes), the completion signal CPS may be output (S75), and the host 2000 of FIG. 1 may output a next request to the memory system 1000 in response to the completion signal CPS.

Next, an embodiment in which a completion signal is output or delayed according to various throughput will be described.

Figure 9:
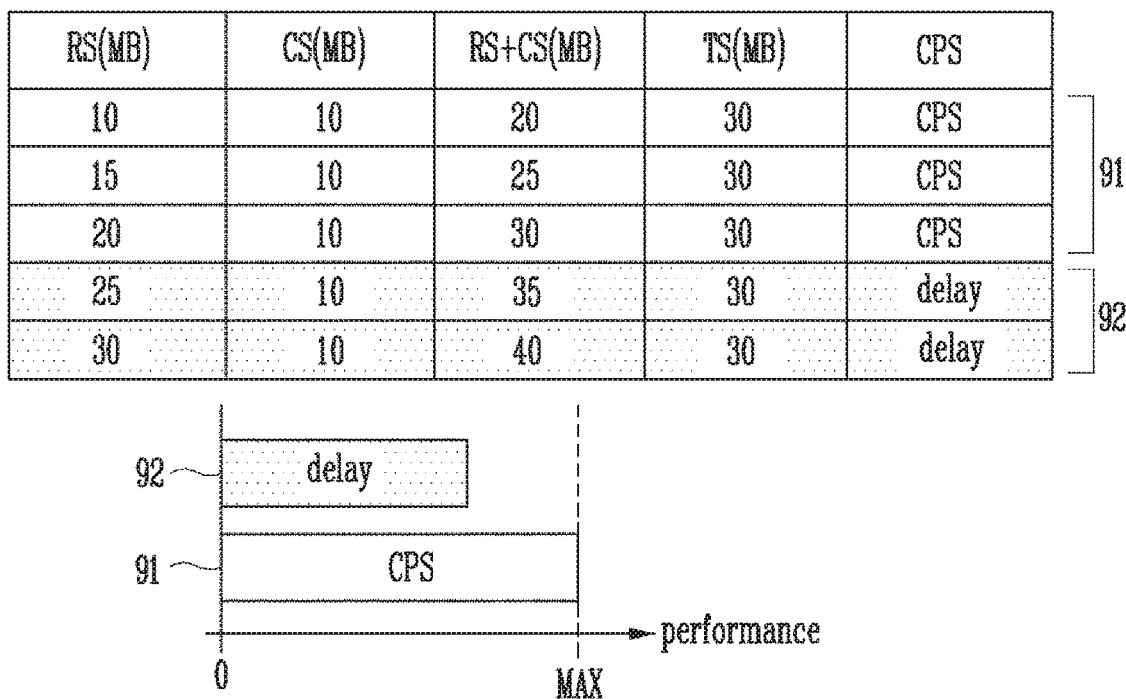
FIG. 9 is a diagram illustrating various cases where a completion signal is output or delayed according to an embodiment of the present disclosure.

FIG. 9 is a diagram illustrating various cases where a completion signal CPS is output or delayed according to an embodiment of the present disclosure.

Referring to FIG. 9, various cases 91 and 92 where request throughput are different from each other with respect to a current throughput CS are illustrated as an example. In FIG. 9, each throughput is represented in megabytes (MBs). However, each throughput may be represented in other units, e.g., bytes, kilobytes, gigabytes, etc.

A target size TS of the memory system 1000 may be temporarily set. For example, the target size TS may be set within a range that does not exceed a maximum delay time of the completion signal CPS. In other words, the output of the completion signal CPS may be delayed when the internal throughput of the memory system 1000 is increased. However, the delay time cannot be unlimitedly lengthened, and hence the maximum delay time may be set depending on the memory system 1000. Therefore, in this embodiment, the target size TS may be set within the range that does not exceed the maximum delay time. When the memory system 1000 is operated as described above, the completion signal CPS may be delayed and then output even at a time at which the completion signal CPS can be output in a conventional art. As such, in this embodiment, the number of times in which a throttling operation is performed may be decreased as compared with the conventional art, and thus the overall performance of the memory system 1000 may be improved. The performance means lifespan of the memory system. That is, in the conventional art, when the temperature of the memory system 1000 is increased due to an increase in the internal throughput of the memory system 1000, the memory system 1000 performs the throttling operation so as to prevent an overload of the memory system 1000. When the throttling operation is performed, the performance of the memory system 1000 is temporarily decreased, such as that the operating speed of the memory system 1000 is decreased. However, in this embodiment, the delay time of the completion signal CPS is adjusted, so that the number of times in which the throttling operation is performed may be decreased. Accordingly, a minimum level of acceptable performance of the memory system 1000 may be ensured.

Cases 91 shown in FIG. 9 are cases where the completion signal CPS is output, and cases 92 shown in FIG. 9 are cases where the completion time is delayed.

In a first example of the cases 91 the request throughput RS is 10 MB when the target size TS is 30 MB and the current throughput CS is 10 MB. Since the current throughput CS is 10 MB and the request throughput RS is 10 MB, the total throughput (RS+CS) obtained by adding the current throughput CS and the request throughput RS becomes 20 MB. Since the total throughput (RS+CS) is less than the target size TS, the completion signal CPS may be output. In a next example of the cases 91, since the total throughput (RS+CS) is 25 MB when the request throughput size RS is 15 MB, the completion signal CPS may be output. In further example of the cases 91, since the request throughput RS is equal to the total throughput (RS+CS) when the request throughput RS is 30 MB, the completion signal CPS may be output.

Like the cases 91, the memory system 1000 may be operated with a maximum (MAX) performance when the completion signal CPS is output. In other words, that the memory system 1000 is operated with the MAX performance corresponds to a case where the current throughput CS and the request throughput RS are sizes suitable when the memory system 1000 is operated, which means that the completion signal CPS can be output.

In a first example of the cases 92 the request throughput RS is 25 MB. Since the total throughput (RS+CS) becomes 35 MB and is greater than the target size TS, the completion signal CPS is not output but may be delayed. In a next example of the cases 92, since the total throughput (RS+CS) is 40 MB when the request throughput RS is 30 MB, the completion signal CPS is not output but may be delayed.

Like the cases 91, the memory system 1000 is not operated with the MAX performance when the completion signal CPS is delayed. However, the throttling operation is prevented from being performed, so that the performance of the memory system 1000 may be prevented from being rapidly decreased.

As described above, the total throughput (RS+RC) is compared with the target size TS, and the completion signal CPS is output or delayed based on the comparison result, so that the performance of the memory system 1000 may be prevented from being decreased, or the lowest performance of the memory system 1000 may be ensured.

Figure 10:
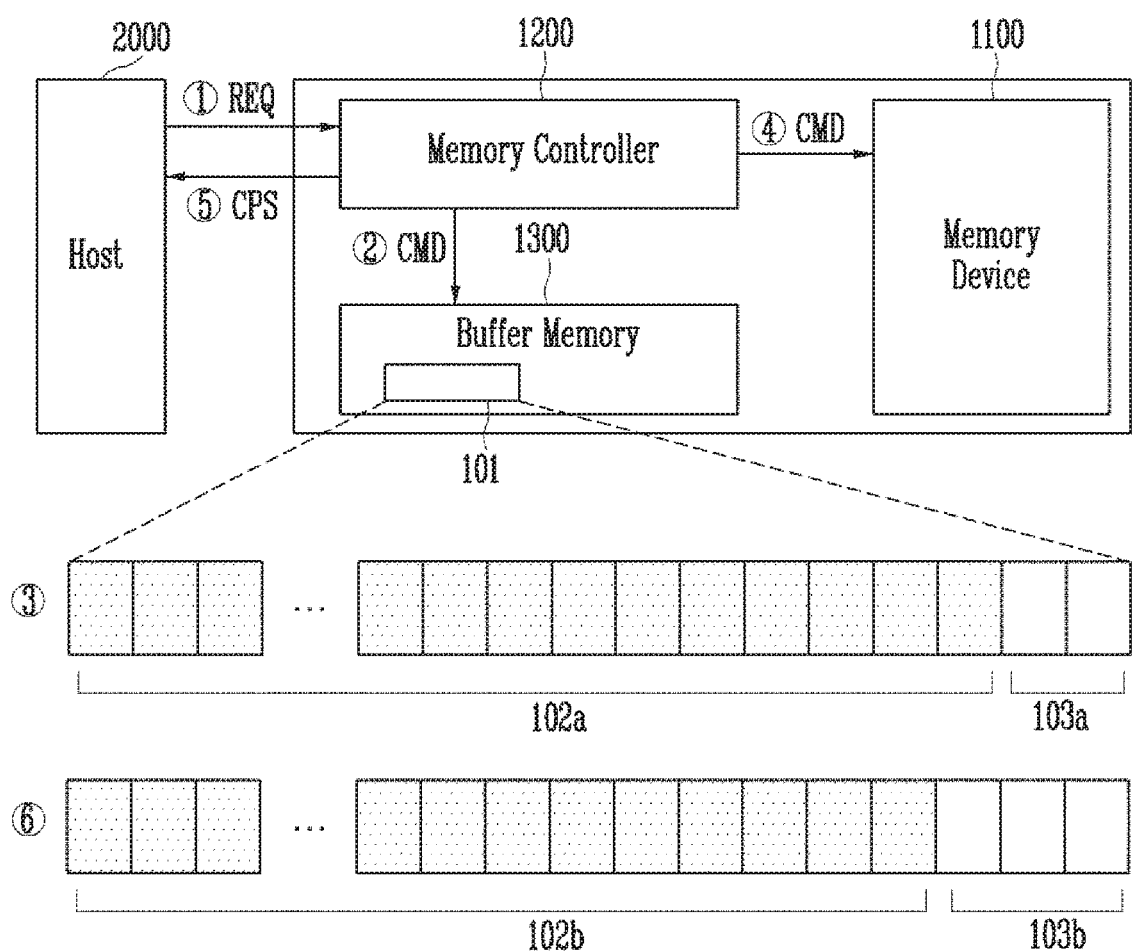
FIG. 10 is a diagram illustrating an operation of a memory system that outputs a completion signal according to an internal throughput, regardless of a buffer memory in which commands are stored.

FIG. 10 is a diagram illustrating an operation of a memory system that outputs a completion signal according to an internal throughput, regardless of the buffer memory in which commands are stored. The operation of FIG. 10 may be performed by the memory system 1000 and the host 2000 as shown in FIGS. 1 to 9.

Referring to FIG. 10, when the host 2000 transmits a request REQ to the memory system 1000 (①), the memory controller 1200 of the memory system 1000 may convert the received request REQ into a command CMD to be processed therein, and transmit the command CMD to the buffer memory 1300 (②). The buffer memory 1300 may temporarily store various information, and the command CMD may be temporarily stored in a host queue buffer 101 (③). A plurality of commands received from the host 2000 may be stored in the host queue buffer 101, and a free region may be secured whenever the command CMD is fetched. For example, the host queue buffer 101 may be allocated with a certain capacity where commands received from the host 2000 can be stored in the buffer memory 1300, and a plurality of commands may be stored in the allocated capacity. The host queue buffer 101 may include a region 102a and a free region 103a. In the region 102a, the commands are stored within the allocated capacity. The free region 103a may be varied. The memory controller 1200 may transmit the command CMD temporarily stored in the host queue buffer 101 to the memory device 1100 according to a queued order of commands (④). In other words, the memory controller 1200 may fetch the command CMD.

Subsequently, the memory controller 1200 may output a completion signal CPS to the host 2000 (⑤) or delay the output of the completion signal CPS according to a current throughput CS and a request throughput RS. The host 2000 may delay a next request REQ until the completion signal CPS is received. That is, when the completion signal CPS is received, the host 2000 may transmit the next request REQ to the memory system 1000. When the completion signal CPS is not received, the host 2000 does not output the next request REQ but may delay the next request REQ.

When the completion signal CPS is output to the host 2000 or when the output of the completion signal CPS is delayed, the memory device 1100 may execute the command CMD received from the memory controller 1200. The memory controller 1200 sequentially fetch commands CMD queued in the host queue buffer 101 in response to the command CMD executed in the memory device 1100. Therefore, when the commands CMD are fetched before the request REQ is received from the host 2000, the region 102b in the host queue buffer 101 may be relatively decreased, and the free region 103b may be relatively increased (⑥).

In the above-described embodiment, the output or delay of the completion signal CPS is determined according to a throughput of the memory system 1000. However, a background operation of the memory system 1000 may be determined, in addition to the output or delay of the completion signal CPS. This will be described in detail as follows.

Figure 11:
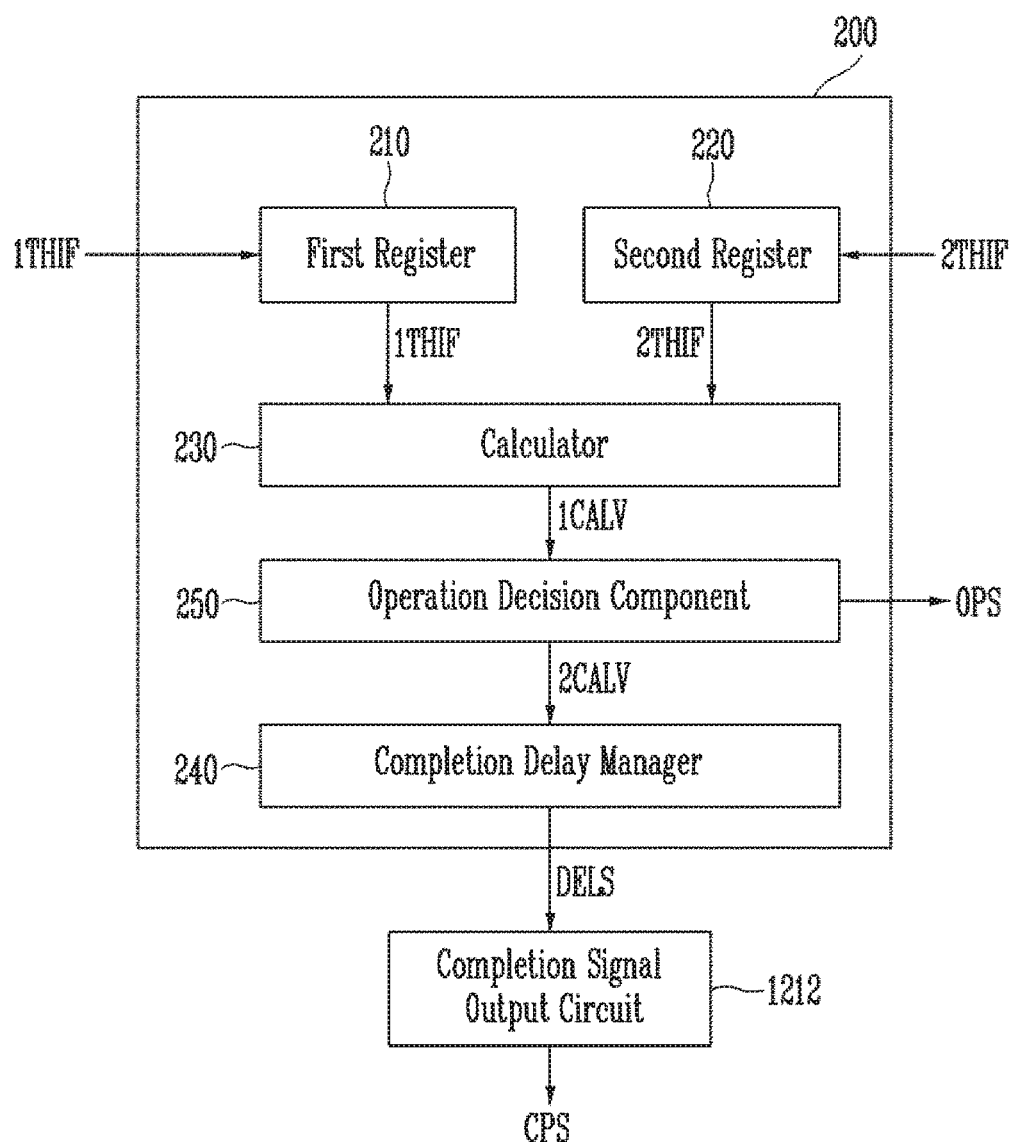
FIG. 11 is a diagram illustrating a throttling manager according to another embodiment of the present disclosure.

FIG. 11 is a diagram illustrating a throttling manager, e.g., the throttling manager 200 of FIG. 2, according to another embodiment of the present disclosure.

Referring to FIG. 11, the throttling manager 200 may further include an operation decision component 250. In FIG. 11, the other components 210 to 240, except the operation decision component 250, are identical to those described in FIG. 6, and therefore, further description thereof is omitted here.

The operation decision component 250 may output an operation signal OPS for controlling operations performed in the memory system 1000 according to a first calculation value 1CALV output from the calculator 230. For example, the operation decision component 250 may output an operation signal OPS for performing a background operation of the memory system 1000 according to the first calculation value 1CALV. The background operation means an operation performed in the memory system 1000 so as to achieve autonomous system management of the memory system 1000 regardless of a request REQ from the host 2000. For example, the background operation may include a garbage collection operation, a wear leveling operation, and the like.

That is, the operation decision component 250 may decide whether the background operation is to be performed in the memory system 1000, based on the first calculation value 1CALV, and output the operation signal OPS such that the background operation can be performed when it is decided that the internal throughput of the memory system 1000 is small. The CPU 1210A or 1210B may generate commands necessary for the background operation in response to the operation signal OPS. For example, when it is decided that the internal throughput of the memory system 1000 is greater than a reference value according to the first calculation value 1CALV, the operation decision component 250 may not output the operation signal OPS. When it is decided that the internal throughput of the memory system 1000 is less than or equal to the reference value, the operation decision component 250 may output the operation signal OPS. The reference value may trigger performance of the garbage collection operation or the wear leveling operation. Also, the reference value may be differently set depending on dies and memory blocks, which are included in the memory device 1100.

The operation decision component 250 may decide whether the operation signal OPS is to be output, and output a second calculation value 2CALV through a terminal different from that to which the operation signal OPS is output. The second calculation value 2CALV may be a value equal to the first calculation value 1CALV, and be transmitted to the completion delay manager 240. Therefore, the completion delay manager 240 shown in FIG. 11 may be operated identically to the completion delay manager 240 shown in FIG. 6.

FIGS. 12 to 16 are diagrams illustrating still another embodiment of the present disclosure.

Figure 12:
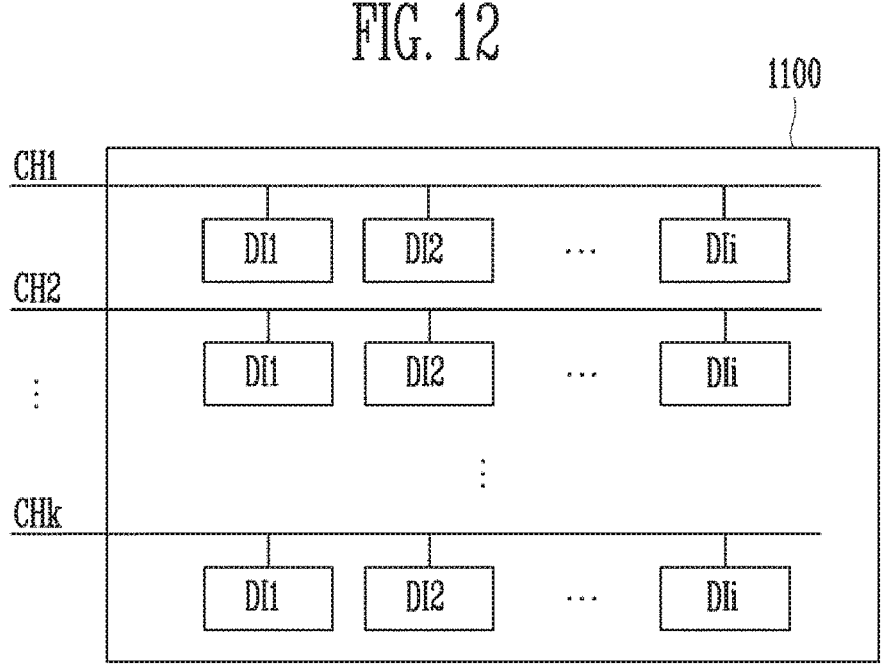

FIG. 12 is a diagram illustrating a configuration of a memory device, e.g., the memory device 1100 of FIG. 1.

Referring to FIG. 12, the throttling manager 200 described in FIG. 11 may output different operation signals OPS and delay signals DELS depending on internal throughputs of dies DI1 to DIi (where i is a positive integer) included in the memory device 1100. For example, the dies DI1 to DIi may communicate with the memory controller 1200 of FIG. through different channels CH1 to CHk (where k is a positive integer). For example, a first group of dies DI' to DIi may communicate with the memory controller 1200 through a first channel CH1, and a second group of dies DI1 to DIi may communicate with the memory controller 1200 through a second channel CH2. In this manner, k groups of dies may communicate with the memory controller 1200 through first to kth channels CH1 to CHk, respectively. Throughputs of the dies DI1 to DIi may be different from each other depending on a command CMD that is being executed, and throughputs of the first to ith dies DI1 to DIi respectively coupled to the first to kth channels CH1 to CHk may be different from each other. The above-described super block will be described in detail as follows.

Figure 13:
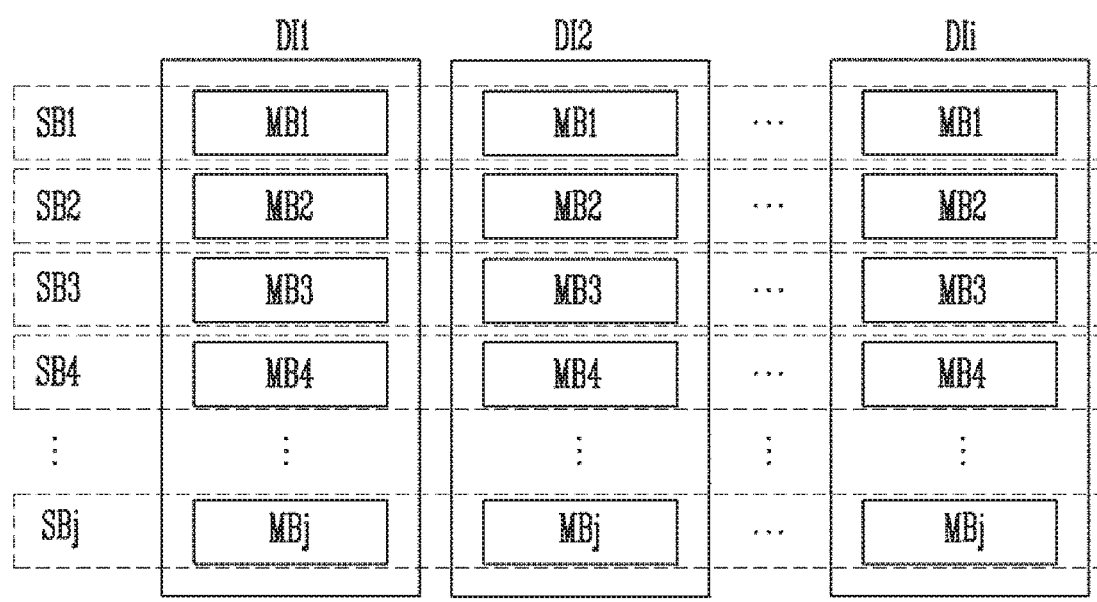

FIG. 13 is a diagram illustrating a super block, which may be included in the memory device 1100 of FIG. 12.

Referring to FIG. 13, the super block may be a group of memory blocks of first to ith dies DI1 to DIi coupled to the same channel. For example, a first super block SB1 may be a group of first memory blocks MB1 in the first to ith dies DI1 to DIi, a second super block SB2 may be a group of second memory blocks MB2 in the first to ith dies DI1 to DIi, and a jth super block SBj may be a group of jth memory blocks MBj (where j is a positive integer) in the first to ith dies DI1 to DIi. Each of the first to jth super blocks SB1 to SBj may be logically operated as if they are one block. For example, when the first super block SB1 is selected, the first memory blocks MB1 in the first super block SB1 may all be selected, and a program, read or erase operation may be simultaneously performed on the first memory blocks MB1 in the first super block SB1.

FIGS. 14 to 16 are tables illustrating throttling performances according to various internal throughputs.

In FIGS. 14 to 16, it is assumed that the maximum performance of a memory system or each super block is 300 MB/s, and a case where the same request throughput RS is provided will be described as an example.

Referring to FIG. 14, the memory system adjusts a throttling rate value THR of each of super blocks SB1 to SB7 according to a request throughput RS and a current throughput CS of each of the super blocks SB1 to SB7, so that the performance of the memory system may be prevented from being decreased. For example, when super blocks 141 in which a small amount of throttling is required and super blocks 142 in which a large amount of throttling is required are mixed in the same memory system, the memory system may increase the performance thereof when an operation of the super blocks 141 in which a small amount of throttling is required is performed, and decrease the performance thereof when an operation of the super blocks 142 in which a large amount of throttling is required is performed.

Specifically, index is a value CS/RS obtained by dividing the current throughput CS by the request throughput RS, and performance value PF is a performance rate of each super block. The performance value PF may be obtained a lesser of a maximum performance value (300 MB/s) and that maximum performance value divided by the index.

Average performance value APF may be obtained by dividing the sum of the performance values of the individual super blocks by the number of super blocks. The throttling rate value THR of a particular super block may be obtained by subtracting the performance value PF of that super block from the average performance value APF. Decimals in a throttling rate value THR may be rounded off or discarded.

In the embodiment shown in FIG. 14, the throttling rate value THR of a first super block SB1 is lowest as −207, which means that a smallest amount of throttling is required in the first super block SB1. On the other hand, the throttling rate value THR of a seventh super block SB7 is highest as +74, which means that a largest amount of throttling is required in the seventh super block S37. Therefore, the memory system may allow the performance value PF in an operation of the seventh super block SB7 to be lowest (PF=19), and allow the performance value PF in an operation of the first super block SB1 to be highest (PF=300). In this manner, when current throughput CS of the first to seventh super blocks SB1 to SB7 are different from each other, the performance value PF of each super block is adjusted, so that the average performance value APF of the memory system may be maintained as 92.96. The average performance value APF of the first to seventh super blocks SB1 to SB7 is less than the maximum performance value (300 MB/s), but the performance of the memory system is prevented from being rapidly decreased. Therefore, the number where a throttling operation is performed in some super blocks may be decreased.

FIG. 15 illustrates a case where only the request throughput RS exists in all the super blocks SB1 to SB7, and the current throughput CS does not exist (0), which corresponds to a case where all the super blocks SB1 to SB7 can be operated with the highest performance. Since the throttling rate value THR is 0, the throttling operation is not performed.

FIG. 16 illustrates a case where the current throughput CS of all the super blocks SB1 to SB7 is very greater than the request throughput RS of all the super blocks SB1 to S37, which corresponds to a case where all the super blocks SB1 to SB7 can be operated with the lowest performance. Although the performances of all the super blocks SB1 to SB7 are decreased, the throttling rate value THR is 0. Hence the throttling operation is not performed in the memory system, and thus the lowest performances of all the super blocks SB1 to SB7 may be ensured.

As described above, the performances of super bucks are adjusted according to internal throughputs of the super blocks, so that the number of times the throttling operation is performed may be decreased. Accordingly, the performance of the memory system can be prevented from being decreased.

Figure 17:
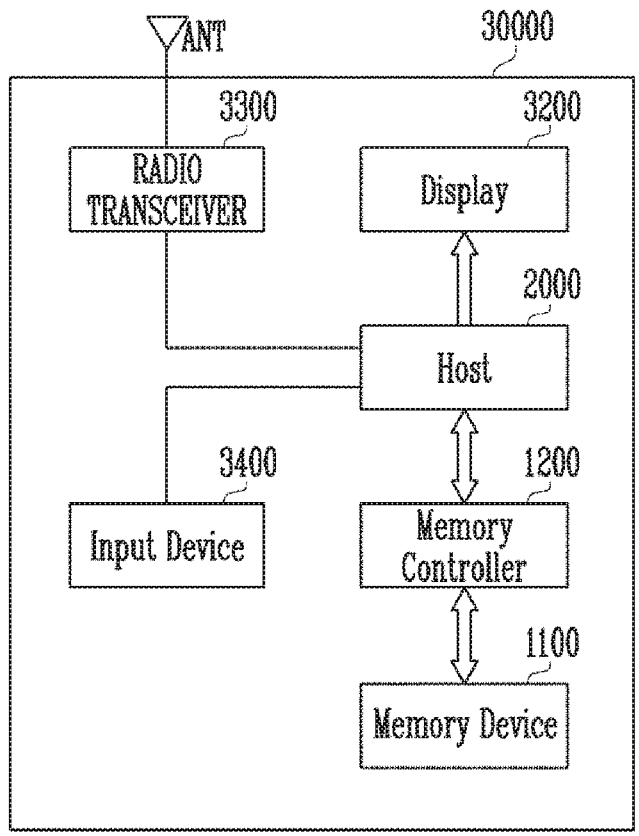
FIG. 17 is a diagram illustrating another embodiment of the memory system shown in FIG. 1.

FIG. 17 is a diagram illustrating another embodiment of the memory system shown in FIG. 1.

Referring to FIG. 17, memory system 30000 may be implemented as a cellular phone, a smart phone, a tablet personal computer (PC), a personal digital assistant (PDA), or a wireless communication device.

The memory system 30000 may include a memory device 1100, a memory controller 1200 capable of controlling an operation of the memory device 1100, and a host 2000 capable of controlling the memory controller 1200. The memory controller 1200 may control a data access operation of the memory device 1100, e.g., a program operation, an erase operation, a read operation, or the like under the control of the host 2000.

Data programmed in the memory device 1100 may be output through a display 3200 under the control of the memory controller 1200.

A radio transceiver 3300 may transmit and receive radio signals through an antenna ANT. For example, the radio transceiver 3300 may convert a radio signal received through the antenna ANT into a signal that can be processed by the host 2000. Therefore, the host 2000 may process a signal output from the radio transceiver 3300 and transmit the processed signal to the memory controller 1200 or the display 3200. The memory controller 1200 may transmit the signal processed by the host 2000 to the memory device 1100. Also, the radio transceiver 3300 may convert a signal output from the host 2000 into a radio signal, and output the converted radio signal to an external device through the antenna ANT. An input device 3400 is a device capable of inputting a control signal for controlling an operation of the host 2000 or data to be processed by the host 2000, and may be implemented as a pointing device such as a touch pad or a computer mount, a keypad, or a keyboard. The host 2000 may control an operation of the display 3200 such that data output from the memory controller 1200, data output from the radio transceiver 3300, or data output from the input device 3400 can be output through the display 3200.

Figure 18:
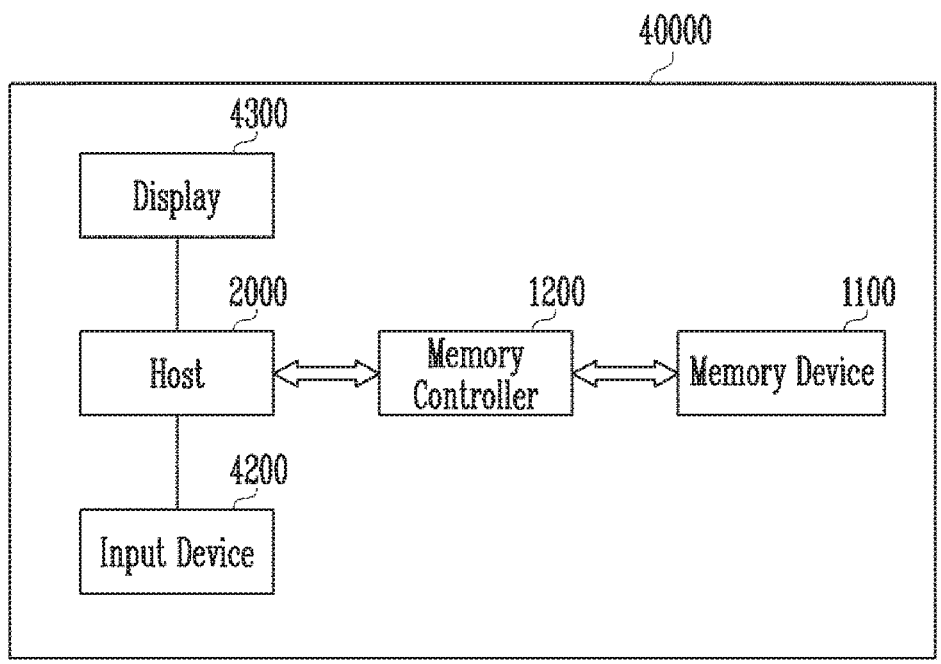
FIG. 18 is a diagram illustrating another embodiment of the memory system shown in FIG. 1.

FIG. 18 is a diagram illustrating another embodiment of the memory system shown in FIG. 1.

Referring to FIG. 18, memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a memory device 1100, a memory controller 1200 capable of controlling an operation of the memory device 1100, and a host 2000 capable of controlling the memory controller 1200.

The host 2000 may output data stored in the memory device 1100 through a display 4300 according to data input through an input device 4200. For example, the input device 4200 may be implemented as a pointing device such as a touch pad or a computer mouse, a keypad, or a keyboard.

The host 2000 may control the overall operations of the memory system 40000, and control an operation of the memory controller 1200.

Figure 19:
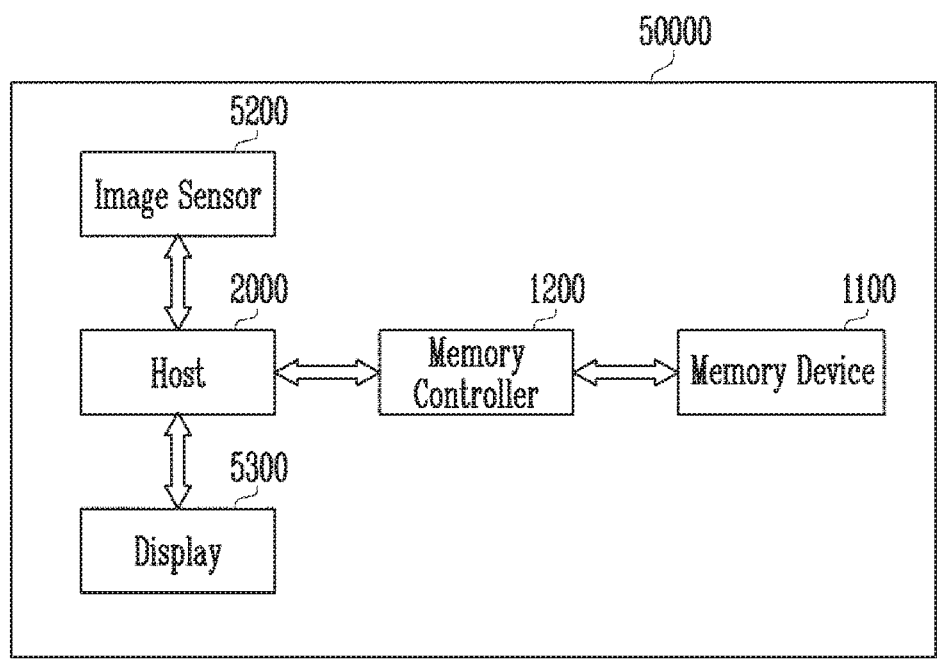
FIG. 19 is a diagram illustrating another embodiment of the memory system shown in FIG. 1.

FIG. 19 is a diagram illustrating another embodiment of the memory system shown in FIG. 1.

Referring to FIG. 19, memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a memory device 1100, a memory controller 1200 capable of controlling a data processing operation of the memory device 1100, e.g., a program operation, an erase operation, or a read operation, and a host 2000 capable of controlling the memory controller 1200.

An image sensor 5200 of the memory system 50000 may convert an optical image into digital signals, and the digital signals may be transmitted to the host 2000 or the memory controller 1200. Under the control of the host 2000, the digital signals may be output through a display 5300, or be stored in the memory device 1100 through the memory controller 1200. In addition, data stored in the memory device 1100 may be output through the display 5300 under the control of the host 2000.

Figure 20:
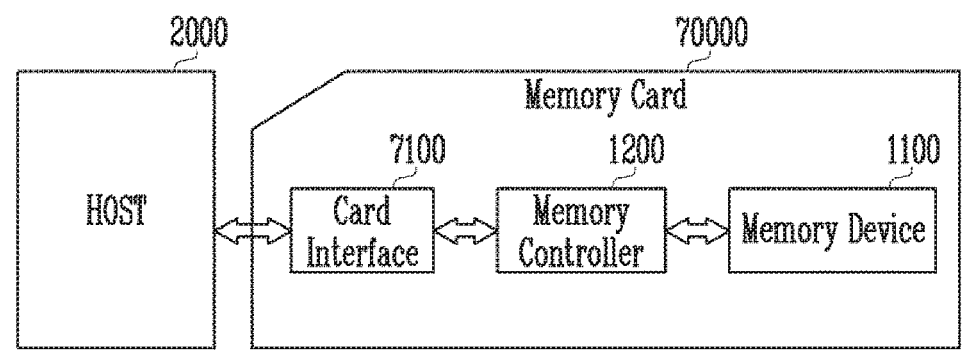
FIG. 20 is a diagram illustrating another embodiment of the memory system shown in FIG. 1.

FIG. 20 is a diagram illustrating another embodiment of the memory system shown in FIG. 1.

Referring to FIG. 20, the memory system may include a host 2000 and a memory card 70000.

The memory card 70000 may be implemented with a smart card. The memory card 70000 may include a memory device 1100, a memory controller 1200, and a card interface 7100.

The memory controller 1200 may control data exchange between the memory device 1100 and the card interface 7100. In some embodiments, the card interface 7100 may be a Secure Digital (SD) card interface or a Multi-Media Card (MMC) interface, but the present disclosure is not limited thereto. Also, the card interface 7100 may interface data exchange between a host 2000 and the memory controller 1200 according to a protocol of the host 2000. In some embodiments, the card interface 7100 may support a Universal Serial Bus (USB) protocol and an Inter-Chip (IC)-USB protocol. The card interface 7100 may mean hardware capable of supporting a protocol used by the host 2000, software embedded in the hardware, or a signal transmission scheme.

According to embodiments of the present disclosure, a completion signal is output to the host by considering internal throughput of the memory system, so that throttling of the memory system may be efficiently performed.

Various embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory controller coupled between a host and a memory device comprising:
    a command generator configured to generate a command for an operation performed in the memory device in response to a request received from the host;
    a throttling manager configured to compare a current throughput of data that is being currently processed by the operation performed in a memory system and a request throughput of data that is to be processed by a next operation to be performed in the memory system, activate a delay signal when a total throughput of the current throughput and the request throughput is greater than a target size, and inactivate the delay signal when the total throughput of the current throughput and the request throughput is less than or equal to the target size, wherein the memory system includes the memory controller and the memory device; and
    a completion signal output circuit configured to delay an output of a completion signal to inform the host of a status ready to receive a next request when the delay signal is activated, and to output the completion signal when the delay signal is inactivated.

2. The memory controller of claim 1, wherein the throttling manager includes:
   a first register configured to temporarily store information on the current throughput;
   a second register configured to temporarily store information on the request throughput;
   a calculator configured to output a first calculation value by calculating the current throughput and the request throughput from the first and second registers; and
   a completion delay manager configured to activate or inactivate the delay signal according to the first calculation value.

3. The memory controller of claim 2, wherein the calculator:
   calculates the total throughput by adding the current throughput and the request throughput;
   compares the total throughput with the target size; and
   outputs the first calculation value, based on the comparison result.

4. The memory controller of claim 3, wherein the target size includes a reference value where a throttling operation is performed in the memory system.

5. The memory controller of claim 3, wherein the completion delay manager:
   when the total throughput is greater than the target size, activates the delay signal for delaying the completion signal according to the first calculation value; and
   when the total throughput is less than or equal to the target size, inactivates the delay signal according to the first calculation value.

6. The memory controller of claim 1, wherein the current throughput includes at least one of a current data size that is being processed in the memory system, a number of commands being executed in the memory system, and a depth of commands queued in the memory system.

7. The memory controller of claim 1, wherein the request throughput includes at least one of a data size requested by the host, a number of commands requested by the host, and a depth of commands requested by the host.

8. The memory controller of claim 2, further comprising an operation decision component configured to output an operation signal for performing a background operation of the memory system according to the first calculation value.

9. The memory controller of claim 8, wherein the operation decision component:
   inactivates the operation signal, when it is determined that the data size processed in the memory system, based on the first calculation value, is greater than the reference value; and
   activates the operation signal, when it is determined that the data size processed in the memory system, based on the first calculation value, is less than or equal to the reference value.

10. The memory controller of claim 9, wherein the reference value is set to trigger performance of a garbage collection operation or wear leveling operation.

11. The memory controller of claim 10, wherein, when the operation signal is output, the command generator generates commands for performing the garbage collection operation or the wear leveling operation.

12. The memory controller of claim 8, wherein, when the operation signal is output, the operation decision component outputs a second calculation value equal to the first calculation value to the completion delay manager.

13. A memory system comprising:
   a plurality of memory devices storing data;
   a memory controller generating a command according to a request of a host coupled to the memory controller, transferring the command, signals or data between the host and the memory devices; and
   a buffer memory temporarily storing the command before the memory controller transfers the command to the memory devices,
   wherein the memory controller logically groups a plurality of memory blocks included in the memory devices into a plurality of super blocks, adjusts a throttling rate according to a current throughput of an operation performed in each of the super blocks according to the command and a request throughput of a next operation to be performed in each of the super blocks, increases a performance value of each of the super blocks in which the throttling rate is relatively low among the super blocks, and decreases the performance value of each of super blocks in which the throttling rate is relatively high among the super blocks, and
   wherein the performance value is a performance rate of each of the super blocks, and is less than a maximum performance value of each of the super blocks.

14. The memory system of claim 13, wherein the throttling rate is calculated by subtracting the performance value of the super block from an average performance value of the memory system.

15. The memory system of claim 14, wherein the average performance value is calculated by dividing a sum of performance values of each of the super blocks by the number of super blocks.

16. The memory system of claim 15, wherein the performance value of each of the super blocks is calculated by dividing a maximum performance value of the memory system by an index.

17. The memory system of claim 16, wherein the index is calculated by dividing the current throughput of each of the super blocks by the request throughput size.

* * * * *